Sept. 26, 1933.　　　L. E. HIRSCHFELD　　　1,928,177
CONVERTIBLE SEAT FOR VEHICLES
Filed Dec. 28, 1931
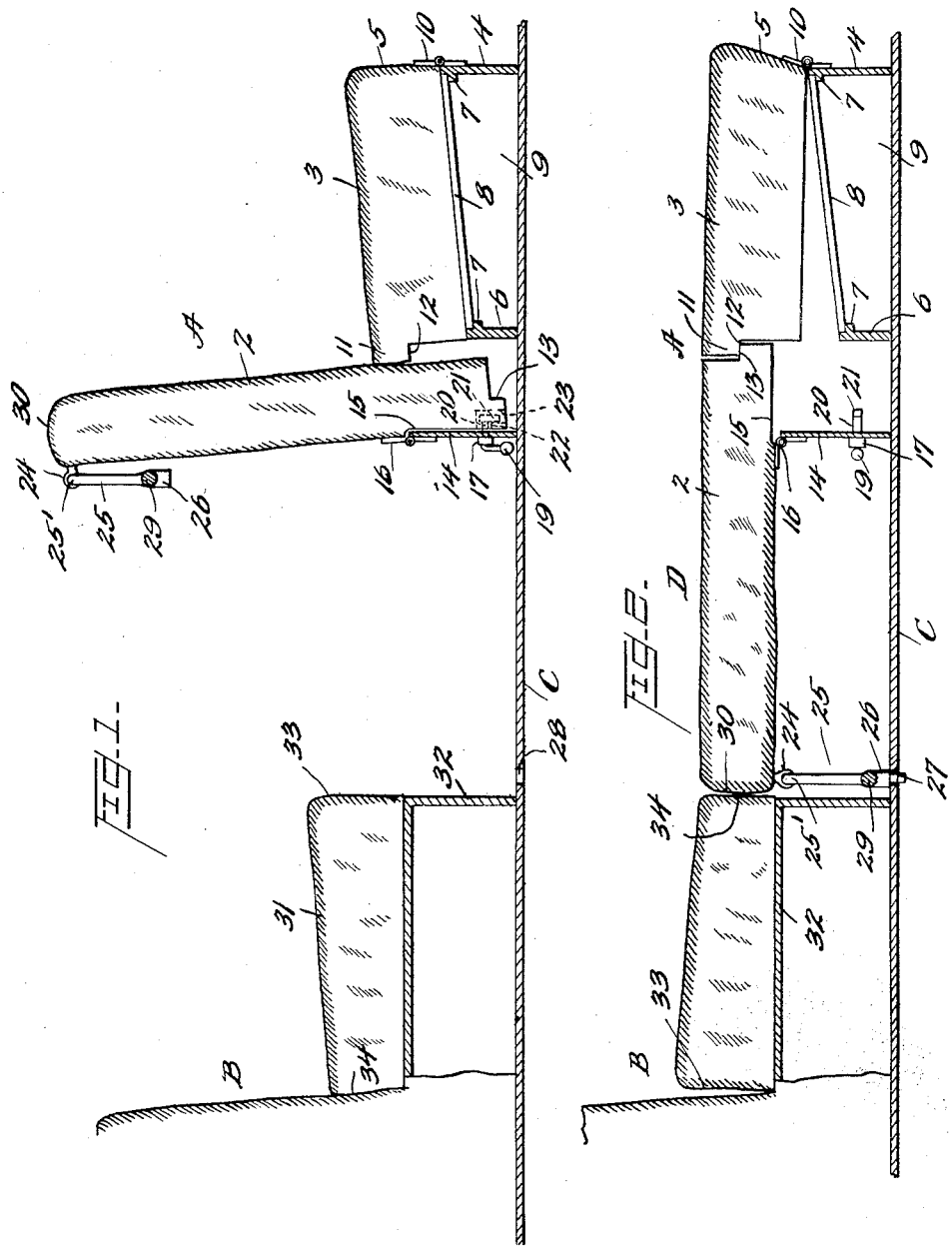

Patented Sept. 26, 1933

1,928,177

UNITED STATES PATENT OFFICE 1,928,177

CONVERTIBLE SEAT FOR VEHICLES

Louis E. Hirschfeld, Passaic, N. J.

Application December 28, 1931
Serial No. 583,555

2 Claims. (Cl. 155—7)

Generically this invention relates to seats foldable for sleeping purposes, but it is more especially directed to vehicle seats normally used as such and foldable to constitute a bed.

The principal object of this invention is the provision of means for changing the relative positions of the vehicle seats and backs to form a substantially horizontal cushion surface constituting a bed.

A further important object of this invention is the provision of means for hingedly mounting the seat and back portions of the front seat of an automobile or other vehicle, whereby the same may be so positioned with respect to each other and the rear seat as to form a continuous substantially horizontal surface to constitute a bed, and means carried by the back for supporting the front seat section in such position.

Another important object of this invention is the provision of means for hingedly mounting the back and seat sections of an automobile front seat, means carried by the back section for automatically elevating and supporting its seat section in a horizontal plane coincident therewith when moved to a horizontal position, additional means carried by said back for rigidly supporting the same in such lowered position, and the seat section of the rear seat being reversible to form a raised or pillow-like continuation of said horizontal surface, whereby a bed structure is presented.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a fragmentary sectional view of a part of a vehicle with the seats in elevation and in their normal positions; and Fig. 2 is a similar view showing said seats converted into a bed.

The devices of this general character with which I am familiar have proven deficient in either necessitating unsightly construction or requiring a multiplicity of parts or attachments rendering convertibility difficult and entailing material changes in the normal seat structure with a consequent increase in cost of production; and it was to overcome such disadvantages by providing a simplified structure without material visible change in the normal construction, comprising hinged seat sections, means in connection with the front back section for automatically elevating and supporting its seat section in a horizontal plane coincident with that of the back section when the latter is lowered, and means for rigidly supporting said back section in a horizontal position, said sections constituting a mattress-like portion extending to a point adjacent the rear seat, whereby a reversal of said rear seat effects a pillow-like continuation of said composite mattress to form a bed within the vehicle, that I designed the structure forming the subject matter of this invention.

In the illustrated embodiment characterizing this invention there is shown a front vehicle seat structure A, a rear seat structure B and a portion of a vehicle floor C.

The front seat A comprises a suitable spring or cushion back section 2 and similar seat section 3, said seat section 3 is adapted to be supported on a support 4 extending transversely of the vehicle and forming a continuation of the front edge 5 of the seat and with a similar support 6 of lesser heighth adapted to support the rear edge of said seat, said supports being secured to the vehicle body in any well known manner and formed with inwardly projecting flanges 7 forming supporting seats for the detachable cover 8 for space 9 constituting the usual tool box. The seat 3 is hinged to support 4 by hinges 10 secured in any well known manner and for a purpose hereinafter more fully appearing. The rear edge of seat 3 is cut out to form a rearwardly extending projection 11 adapted to normally contact with back 2 and forming a seat 12 adapted to engage the complemental projection 13 formed on the lower end of back 2, as clearly shown in Fig. 2, when the back is in lowered position.

A transverse supporting frame section 14 of a height from the floor C substantially corresponding to that of projection 11 when the seat 5 is in normal position, is suitably secured to the floor and sides of the vehicle body which is adapted to normally seat in countersunk portion 15 and constituting a support for said seat to which it is connected at its upper edge by hinge or hinges 16 secured by screws or in any suitable manner, and additionally constituting a fulcrum connection, for a purpose hereinafter more fully appearing.

Suitably mounted substantially central of member 14 is a lock or catch mechanism 17 having an operating handle or knob 19 and a shaft portion 20 formed with a latch member 21 adapted to extend through slot 22 and within cut-out portion 23 formed in back 2, whereby latch 21 is normally engaged with the wall of said cut-out portion to lock the back rest in upright position and adapted to be operated by handle 19 so as to be withdrawn from slot 22 when it is desired to lower said back, as will be clear without further explanation. It is apparent that when said latch is released and as the back is lowered about its fulcrum hinge 16 the projection 13 will engage seat 12 and elevate the rear edge of seat 3 and support the same in a horizontal position.

Secured to the normal upper rear edge of back rest 2 by anchor members 24 bolted or otherwise suitably secured thereto, is a substantially U-shaped coat rack 25, the parallel end members 25' of which are hingedly mounted in said anchor members. The end members 25' are formed with extensions 26 constituting feet members housing suitable latch elements 27 adapted to extend through slots 28 and be lockingly engaged therein by operation of a suitable key or handle mechanism 29 to rigidly support said back 2 in a horizontal position, as shown in Fig. 2. The key and catch mechanisms may be of any desired well known type.

When the back 2 is in lowered or horizontal position its top edge 30 is adapted to meetingly engage the edge of movable seat section 31 of rear seat B, said section being supported on frame 32 suitably connected to the floor C and the interior body structure of the vehicle in any well known manner. Seat 31 is of the usual construction, the front edge 33 being higher than the rear edge 34, the latter in the present instance being substantially of the same thickness as back 2 of the front seat A, so that when the rear seat 31 is reversed, as shown in Fig. 2, it will incline upwardly from the back 2 to constitute a pillow-like portion and form a continuation of back 2 to effect the complete bed D, as shown in Fig. 2.

In this connection it will be noted that the support 6 may be in the form of upright standards at each edge or may be dispensed with, and the supports 4 and 14 constructed in the form of a box-like structure, if desired, and without departing from the spirit of the invention.

It will also be understood that the top edge 30 of back 2 may be flat or of any corresponding configuration to the meeting edge of back seat section 31 to form a substantially unbroken and smooth joint at such meeting edges when arranged to constitute a bed.

From the above, it is apparent that I have designed a convertible seat structure of unusual simplicity, and that all that is necessary to convert the normally arranged seats A and B into bed D is to disengage catch 23 and lower back 2, whereby movement about its fulcrum point or hinged connection causes engagement of projection 13 with seat 12 to automatically raise and support seat section 3 in the same horizontal plane as back 2, and as said back is lowered the feet 26 will automatically align themselves or register with slots 28, and when latch elements 27 are brought into operative engagement with floor C, said sections will be firmly locked in their proper converted positions, and said bed structure being completed by simply reversing rear seat section 31. It is obvious that a reversal of such operations will return said seat sections to their normal positions. It will also be understood that in cases where the rear seat section is of a uniform thickness its reversal will be unnecessary.

From the foregoing it will be apparent that I have designed a convertible seat structure of great simplicity without materially affecting the appearance of the vehicle, susceptible of being manufactured at a minimum of cost, and wherein the seats are convertible expeditiously from their normal to bed forming positions, as desired.

Although in practice I have found that the form of my invention illustrated in the accompanying drawing and referred to in the above description as the preferred embodiment is the most efficient and practical, yet realizing that the conditions concurrent with the adoption of my invention will necessarily vary, I desire to emphasize that various minor changes in details of construction, proportion and arrangements of parts, may be resorted to within the scope of the appended claims without departing from or sacrificing any of the principles of this invention.

Having thus described my invention, what I desire protected by Letters Patent is as set forth in the following claims:

1. In combination with the front and rear seats of a vehicle, each comprising back and seat sections, the front seat sections being relatively movable with respect to each other, a vertical support for said back section hingedly connected therewith, the front edges of said front and rear seat sections being normally in a higher plane than the rear edges, a catch means formed in said front seat back section adjacent its lower edge, a locking means connected to said vertical support engageable with said catch means to maintain said back in an upright position and releasable to permit movement of said back to a horizontal position, a support carried by said back automatically movable to supporting position when the back is lowered, said support including latch extensions, means engageable with said extensions for locking said support in supporting position and means carried by said back coacting with its seat section to automatically elevate and support the same in horizontal position, whereby said movable back and front and rear seat sections are convertible into a bed structure.

2. In combination with the front and rear seats of a vehicle, each comprising back and seat sections, the front seat sections being relatively movable with respect to each other, a vertical support for said back section hingedly connected therewith, a slotted opening formed in said rear front seat back section adjacent its lower edge constituting a catch means, a locking means mounted in the said vertical support engagable in said opening to maintain said back in an upright position and releasable to permit movement of said back to a horizontal position, a support carried by said back automatically movable to supporting position when the back is lowered, said means including latch extensions, means engagable with said extensions for locking said support in a supporting position, a cut out lateral extension formed in the rear surface of said front section and a complemental cut out extension formed in the end of said front seat back section coacting with said first-mentioned lateral extension to automatically elevate and support said seat section in a horizontal position, whereby when the sections are in substantially horizontal alignment with the rear seat section a bed structure is effected.

LOUIS E. HIRSCHFELD.